United States Patent [19]

Esteban

[11] 3,737,638

[45] June 5, 1973

[54] SERIES-PARALLEL MULTIPLICATION DEVICE USING MODIFIED TWO'S COMPLEMENT ARITHMETIC

[75] Inventor: Daniel Jacques Esteban, La Gaude, France

[73] Assignee: International Business Machines Corporation, Armonk, N.Y.

[22] Filed: July 18, 1972

[21] Appl. No.: 273,008

[52] U.S. Cl. ....................................................235/164

[51] Int. Cl. ....................................................G06f 7/54

[58] Field of Search ........................235/164, 165, 167

[56] References Cited

UNITED STATES PATENTS

| | | | |
|---|---|---|---|
| 3,489,888 | 1/1970 | Wilhelm, Jr. et al. | 235/164 |
| 3,519,809 | 7/1970 | Iverson et al. | 235/164 |
| 3,627,999 | 12/1971 | Iverson et al. | 235/164 |

*Primary Examiner*—Malcolm A. Morrison
*Assistant Examiner*—David H. Malzahn
*Attorney*—Robert B. Brodie, Dewey J. Cunningham and J. Jancin, Jr.

[57] ABSTRACT

A serial para lel multiplication device in which the digits of the multiplicand are coded in two's complement and in which the digits of the multiplier are coded in two's complement modified by inverting the highest ranking digit and appending another digit of predetermined value as the last digit, the appended digit having the same rank as the lowest ranking digit. The devie produces a series of partial products, each partial product being formed by logically combining the inverse of the $i^{th}$ multiplier digit with each multiplicand digit. As a consequence, each partial product digit assumes one value if the correspondingly ranking multiplicand and $i^{th}$ multiplier digits match and another value if they mismatch. The partial product is then corrected by adding to it the value of the $i^{th}$ digit.

2 Claims, 7 Drawing Figures

A SERIES-PARALLEL MULTIPLICATION DEVICE USING MODIFIED TWO'S COMLEMENT ARITHMETIC

BACKGROUND OF THE INVENTION

This invention relates to binary multiplication systems, and more particularly, to serial-parallel multiplication systems with which it is possible to carry out simultaneous multiplication sums.

The arithmetic units of the present digital computers operate generally from binary-coded numbers. For the processing of negative numbers, arithmetic units respond to negative numbers coded in the so-called two's complement representation. In such a type of representation, any algebraic number A can be represented in the most general form:

$$A = -2^n a_n + \sum_{i=1-m}^{i=n-1} 2^i a_i$$

where $a_i$ are coefficients which can assume two values only: 0 or 1, and $m$ and $n$, positive integers.

It is observed, that if $a_n=0$, then A is a positive number written in the form of a sum of positive factors. on the other hand, if $a_n=1$, then A is a negative number written in the form of a negative term ($-2^n$) added to a sum of positive factors ( $$\Sigma 2^i a_i$$

). In such a code, only coefficients $a_i$ are considered, the corresponding power of two being implicitly deduced from the rank of the coefficient in the sequence of coefficients. But the computer which operates upon numbers expressed in such a code must know that coefficients $a_n$, as a matter of fact, must be interpreted as assuming value $-a_n$, at least if $a_n=1$. Thus, the coefficients do not assume two possible values, but three: 0, 1 and −1. Accordingly, complications in the arithmetic operations result generally, and, more particularly, in such operations as multiplication. These complications are in the form of corrective factors to be introduced as a function of the signs of the factors. This makes the circuits cumbersome and requires repetition of the highest rank bit a number of times. This repetition considerably increases the time required for the multiplication.

From amongst the known multiplication devices, there is one which presents particular advantages in numerous applications, due to the good compromise between the rapidity of the computation and the cumbersomeness it achieves. This device is the so-called series-parallel multiplier. Such a device is disclosed in the handbook by R. K. Richards, "Les operations arithmetiques dans les calculatrices electroniques numeriques" published in French by Matot-Brains, in 1958, from page 155, i.e., "Arithmetic Operations in Digital Computers," Van Nostrand Co., New York, 1955, at pages 155–160. In brief, the multiplication involves a multiplicand in the parallel form and a multiplier in the series form. The multiplication is carried out in the form of successive additions, with a shift of partial products equal to the successive multiplicand products by each multiplier bit.

When making use of such a multiplication system with two's complement code numbers, it is necessary to generate three different partial products: the multiplicand, the factor formed of binary zeros, only and the opposite of the multiplicand (which will be generated when the highest weight bit of the multiplier is 1).

SUMMARY OF THE INVENTION

It is an object of this invention to devise a binary multiplication device wherein tests on the signs of the factors are eliminated. It is a related object of this invention to devise such a multiplication device of the series-parallel type wherein one of the factors, A, is in the parallel form and the other factor, B, is in the series form, and, further, wherein the different partial products to be generated can only be two in number (A and −A, respectively) instead of three (A, 0 and −A) as was known in the prior art.

It is a subordinate object of the invention to devise a multiplication device with which it is possible to obtain the sum of two simultaneous multiplications requiring only the generation of a minimum number of different partial products.

These objects are satisfied by an embodiment of a series-parallel multiplier in which the negative numbers utilized by one of the two factors, say, the multiplier, is in effect precoded, in a form which upon multiplication yields a series of partial products each of whose coefficients is represented by a binary value (−1, +1) instead of the prior art ternary value (−1, 0, +1). In the invention, digits of the multiplicand are coded in two's complement. However, the digits of the multiplier are coded in a modified two's complement. The modification consists of inverting the highest ranking digit of a two's complement number and appending another digit of predetermined value as the last digit. The appended digit is considered as having the same rank as the lowest ranking digit.

The device produces a series of partial products, each product being formed by logically combining the inverse of the $i^{th}$ multiplier digit with each multiplicand digit. Each product digit assumes one binary value if the correspondingly ranked multiplicand and $i^{th}$ multiplier digits match and another binary value if they mismatch. Each partial product is then corrected by adding to it the value of the $i^{th}$ multiplier digit.

This particular binary code, the so-called CIM code, is a two-base code wherein any algebraic binary number X is represented by a succession of binary elements (or bits), the ranks of which go from $-m$ to $+n$, $m$ and $n$ being positive integers and one of the two binary elements occupying ranks $-m$ and $1-m$, being of a predetermined state. The decimal value $X_0$ of X is given by the relation:

$$X_0 = \sum_{i=2-m}^{i=n} x_i 2^{i-1} + (x_{1-m} + x_{-m}) 2^{-m}$$

In this relation, $x_i$ corresponds to the binary element of rank $i$. Furthermore, $x_i$ assumes the value of −1 should the binary element of rank $i$ be of the same state as the binary element the state of which is predetermined, and value of +1 should the binary element of rank $i$ be of the other state, and in which coefficients $x_1{}^-{}_m$ and $x^-{}_m$ correspond to the binary elements of rank $1-m$ and $-m$, respectively. The one of the two binary elements corresponds to the binary element of a predetermined state, assuming value −1, the other one following the rule indiciated for coefficients $x_i$.

DESCRIPTION OF THE PREFERRED EMBODIMENTS

Figure 1:
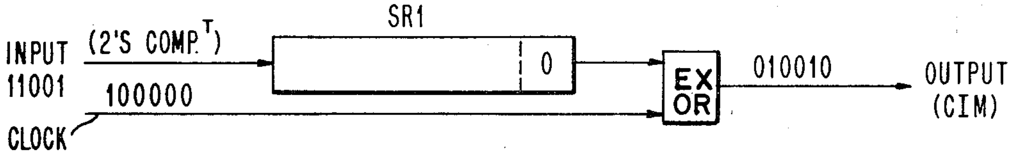
FIG. 1 is a schematic diagram of a serial code-conversion device for precoding at least the multiplier or multiplicand according to the invention.

The drawbacks encountered in the two's complement binary code for some arithmetic operations is due to the fact that the highest rank bit is representative of 0 or −1 whereas all the other bits are representative of 0 or +1. This highest rank bit is, besides, commonly referred to as the sign bit though its function is double. Of course, it determines the sign of the number, but it is also involved in the absolute value of the number. Therefore, one has been led to look for another code wherein all the data elements have only two possible values.

To this end, there has been considered the most general expression of an algebraic number A in a two-base coding system:

$$A = -2^n a_n + \sum_{i=-m}^{i=n-1} 2^i a_i \qquad (1)$$

where $a_n$ and $a_i$'s can assume values 0 or 1 and $m$, $n$ are positive or zero integers. From this, the following identities can be derived:

$$a_i = a_i - \bar{a}_i/2 + ½ \qquad (2)$$

where $\bar{a}_i$ is the one's complement of $a_i$ $$2^{n-1} = \sum_{i=1-m}^{i=n-1} 2^{i-1} + 2^{-m} \qquad (3)$$

Let us consider the identity $a_i = a_i - \bar{a}_i/2 + ½$
Now, $a_i = 1 - \bar{a}_i$ or $1 = a_i + \bar{a}_i$
and $$½ = a_i + \bar{a}_i/2$$

$$1 = ½ + ½$$

Therefore,
$a_i = 1 - \bar{a}_i = ½ + ½ - \bar{a}_i = ½ + (a_i + \bar{a}_i/2) - \bar{a}_i$
Therefore,
$a_i = ½ + a_i + \bar{a}_i - 2\bar{a}_i/2 = ½ + (a_i - \bar{a}_i/2)$ When applying identities (2) and (3) to expression (1), the latter is written:

$$A = (\bar{a}_n - a_n)2^{n-1} + \sum_{i=1-m}^{i=n-1} (a_i - \bar{a}_i).2^{i-1} - 2^{-m} \qquad (4)$$

In this form, it can be observed that the algebraic number can be expressed in terms of coefficients $a_i$ so that:

$$a_i = a_i - \bar{a}_i$$

These coefficients $a_i$ can assume only values +1 and −1. It should be remarked that this expression includes two terms of a same weight $2^{-m}$ that is the smallest weight, one of which being of coefficient $(a_{1-m} - \bar{a}_{1-m})$ and the other one, of coefficient −1. On the other hand, the highest weight is $2^{n-1}$.

It can be supposed that coefficient −1 is represented by binary element 0 and that coefficient +1 is represented by binary element 1. Therefore, when comparing expression (4) with expression (1), it should be observed that expression (4) is expressed in binary form with one bit more than in expression (1) because of the presence of term $-1 \times 2^{-m}$; this additional bit will always be of value −1 and, according to the above set forth convention, will be represented by 0. However, it should be noted that since the last two bits are of similar weight $2^{-m}$, this additional bit 0 will be either the last bit or the last but one bit of the binary word making expression (4) explicit. It is the last bit of the word that is bit 0. When still comparing expressions (1) and (4), it should be further observed that the bit of order $i-1$ in the binary word making expression (4) explicit, is of the same representation as the bit of order $i$ in the binary word making expression (1) explicit, with the exception of the bit of order $n$ of expression (4) which is 1 if the bit of order $n$ of expression (1) is 0, and vice versa.

As a consequence, for any algebraic number, a coding is obtained in a two-base system, wherein each data element may assume only two values +1 and −1. The resulting code, in the following description, will be referred to as the internal modified code or CIM code because it shows similarity with the so-called internal code utilized in the digital-analog converters. For passing from a number expressed in the form of a two's complement binary coded word to this very number expressed in the CIM code, and in conformity with the above-mentioned analysis, the bit of the highest rank must be inverted, the following bits must be preserved and an additional bit 0 must be added in the bit position having its rank immediately lower than the position of the bit being of the samllest rank.

There will now be described a schematic embodiment of a transcoder with which it is possible to pass from the two's complement code to the CIM code, with reference to FIGS. 1 and 2. In FIG. 1, it has been supposed that the number to be transcoded appeared in the two's complement binary code, in the form of a succession of $n$ bits ($n$=5 in the figure). This succession of bits is applied to the input of a shift register SR which is comprised of $n$+1 binary positions. In the initial state, said register contains zeros only, due, for instance, to a previous general resetting. The succession of bits is introduced into register SR. When the last bit of the number is written in the register, the latter contains the five bits of the number and, in addition, a zero in the position on the right. The exclusive OR circuit XOR receives the output of register SR at one input, and a succession of bits from the clock, at the other one. This succession of bits is formed of five zeros followed by a "one." When supposing that, at time $t_0$, register SR contains the five bits of the binary word and one zero in its position on the right, the reading of the output of exclusive OR circuit will be carried out from the next following time $t_1$ and will last over six times $t_1$ through $t_6$. It can be observed that exclusive OR circuit will pass the first 5 bits coming from register SR at times $t_1$ through $t_5$, respectively, and this without any modification of said bits, but that the sixth bit, which is the bit of the highest weight, will be inverted by exclusive OR circuit XOR at time $t_6$ for the latter receives a "one" at its clock input. It can be verified that the thus shown circuit has carried out the two above-mentioned transcoding operations: addition of a zero on the right of the input word and inversion of the bit of the highest rank. The output of circuit XOR, therefore, is representative of the CIM-coded expression of the binary word shown, at the input, as being two's complement-coded.

Figure 2:
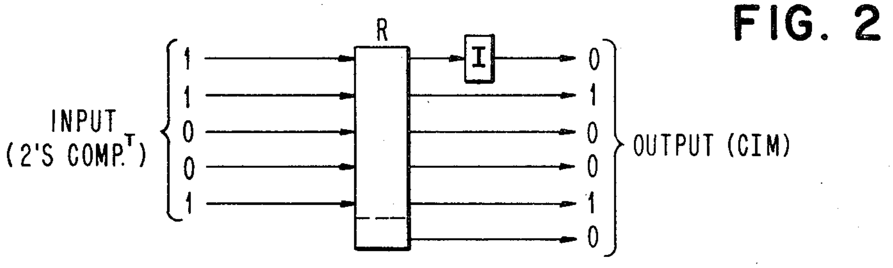
FIG. 2 shows a parallel code conversion device as shown in FIG. 1.

FIG. 2 shows another embodiment of a transcoder in the case when the binary word to be transcoded is available in the parallel form. The two's complement-coded binary word (supposed, here also, to be five-bit), is introduced into the five highest order positions of a six-position register R. The sixth position is representative of a zero, due for instance, to a previous general resetting. The reading of the register is carried out on six parallel-lines, the line corresponding to the highest order bit being representative of an inverter I. The expression of the input binary word is recovered on these six lines as being transcoded into the CIM code. As a matter of fact, the two operations of the transcoding have been carried out, namely, addition of a binary zero of a rank immediately lower than the second bit position of the input word and inversion of the highest rank bit.

By way of an example, there will be considered the transcoding operation of number −7 which is written in the two's complement code, in a five-bit pattern, 11001. The transcoding is divided into two operations: inversion of the highest weight bit and addition of a zero in the bit position following immediately the position of the lowest weight bit. Thus, 010010 is obtained in the CIM code wherein, as reminded, bit 0 is representative of value −1, and bit 1 is, of value +1, on the one hand, and wherein the weights of the different bits have been lowered by one unity, the last two bits being of the same weights, on the other hand. Number 010010 in the CIM code, then, is read as follows:

$$-1 \times 2^3 + 1 \times 2^2 - 1 \times 2^1 - 1 \times 2^0 + 1 \times 2^{-1} - 1 \times 2^{-1} = -7$$

Figure 3:
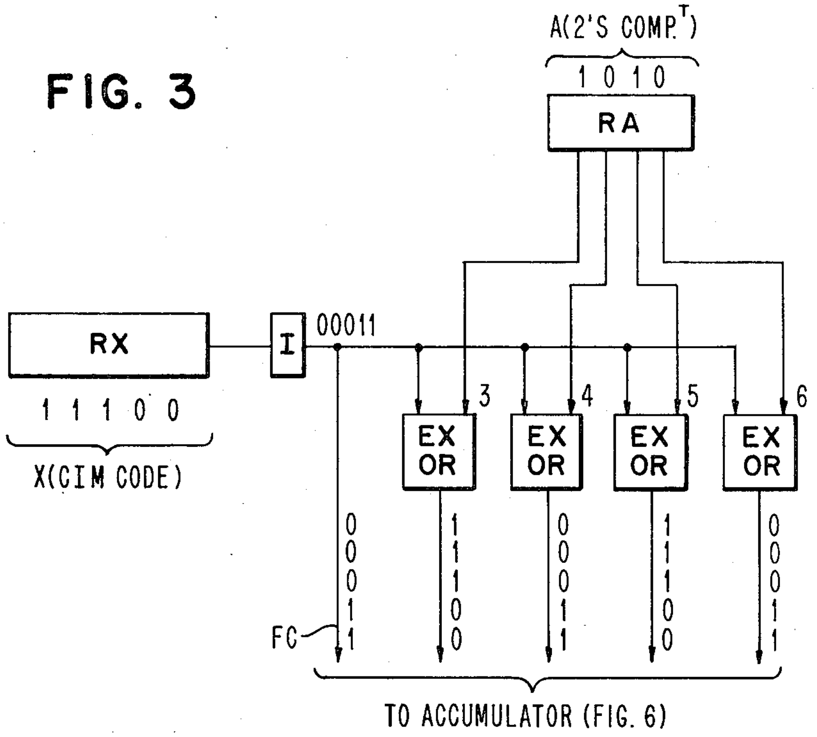
FIG. 3 depicts a block diagram of a multiplication device utilizing the precoding device of FIGS. 1 or 2 as one input and a two's complement for the other input.

The series-parallel multiplication device according to the invention will be disclosed with reference to FIG. 3. The multiplicand will be referred to as A and the multiplier, as X. Multiplicand A is represented in register $R_A$ in the parallel form and in the two's complement code, and multiplier X is represented in register $R_X$ in the series form and in the CIM code (in FIG. 3, A has been shown with 4 bits and X, with 5 bits). The transcoding of factor X into CIM code will have been carried out previously from the expression of number X in the two's complement code, for instance, by making use of the transcoding device shown in FIG. 1, or the one shown in FIG. 2, followed with a serializer. In conformity with the principle of the series-parallel multiplication, upon each elementary time period, a partial product equal to the product of the multiplicand with the value of the corresponding bit of the multiplier, then, is generated. It is reminded here that the value of a multiple bit 0 (in CIM code) in fact, is −1, whereas the value of a bit 1, is +1. Therefore, the partial products to be generated will be −A, should the corresponding bit of X be 0, or +A, should the corresponding bit of X be 1.

For generating these partial products, the exclusive OR circuits XOR 3 through 6 are utilized (the number of the necessary exclusive OR circuits is equal to the number of bits in the multiplicand whatever be the number of the bits in the multiplier). Each circuit XOR 3 through 6 has two inputs: one input connected to a bit position of register $R_A$ and another input receiving the output of inverter I which is representative, upon each elementary time, of the inverse of the bit of multiplier X corresponding to said elementary time. Thus, upon each elementary time, there is generated at the outputs of circuits XOR 3 through 6, either a partial product equal to A, should the bit corresponding to the multiplier be 0 (the output of inverter I, then, is 1) or a partial product equal to $\bar{A}$, should the bit corresponding to the multiplier, be 1 (the output of inverter I the, is 0). It should be noted that the obtained partial products are A and $\bar{A}$; however, the values of A and −A are required. When knowing that the binary expression of −A is $-A = \bar{A} + 1$, a 1 will have to be added to each generated partial product $\bar{A}$. Instead of making directly this addition upon each product $\bar{A}$, the addition can be made in the accumulator of the partial products. In practice, it has been chosen to send the successive outputs of circuits XOR 3 through 6 into the accumulator and, a corrective bit in parallel through line FC, which is equal to 0 should the corresponding outputs be representative of A, and which is equal to 1, should the corresponding outputs be representative of $\bar{A}$. It can be remarked that the succession of the corresponding bits is, in fact, representative of the one's complement of multiplier X, i.e., $\bar{X}$. Therefore, line FC which carries the succession of the corrective bits, is directly connected to the output of inverter I. The accumulation of the successive partial products is, then, carried out in an accumulator an embodiment of which is disclosed further on with reference to FIG. 6. In order to make the understanding clearer, a digitalized example has been shown in FIG. 3, with A = .1010 in the two's complement code (i.e., number −6), and X=11100 in the CIM code (i.e., number +6).

Figure 4:
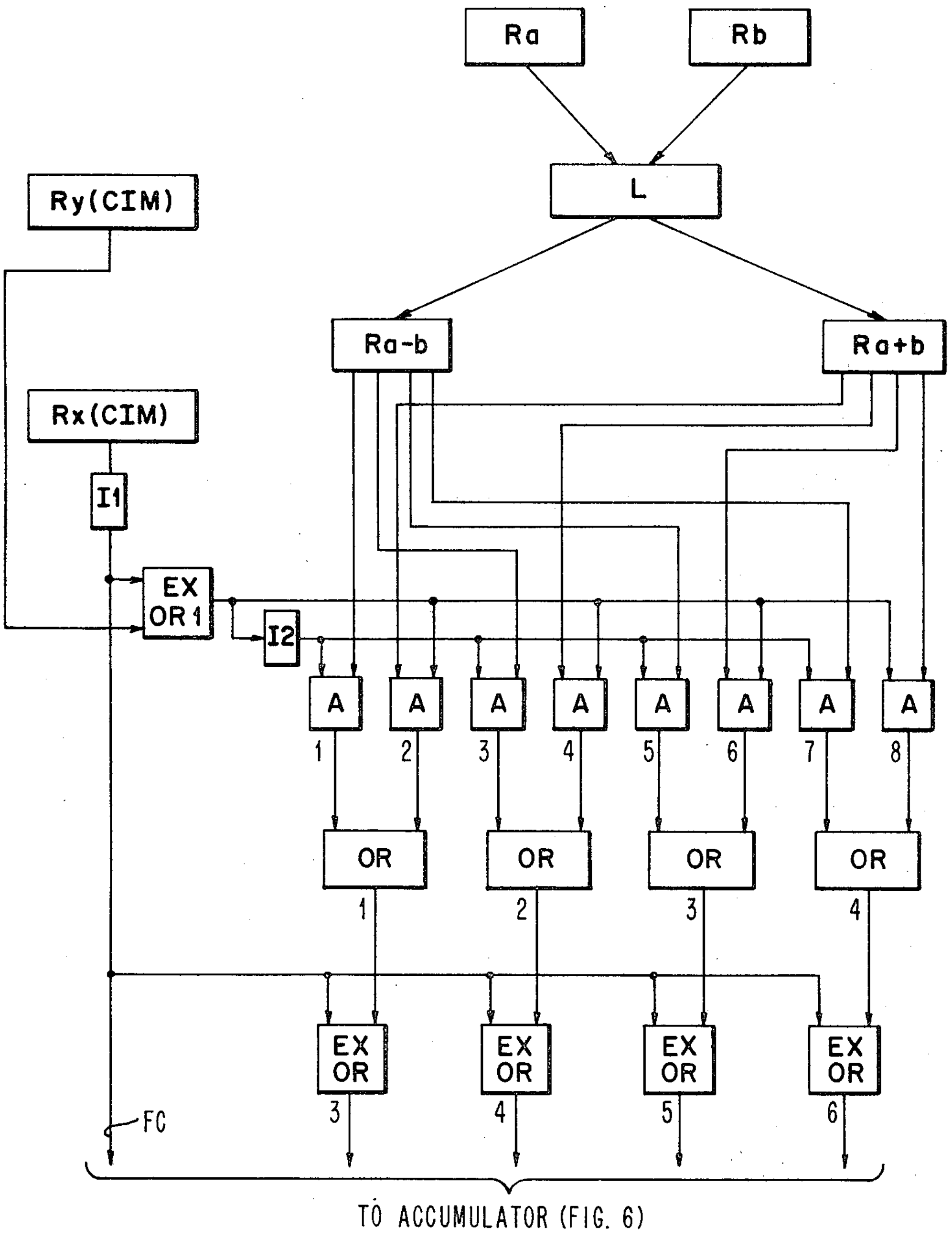
FIG. 4 is a schematic diagram of a device for summing two simultaneous multiplications according to the invention.
Figure 5:
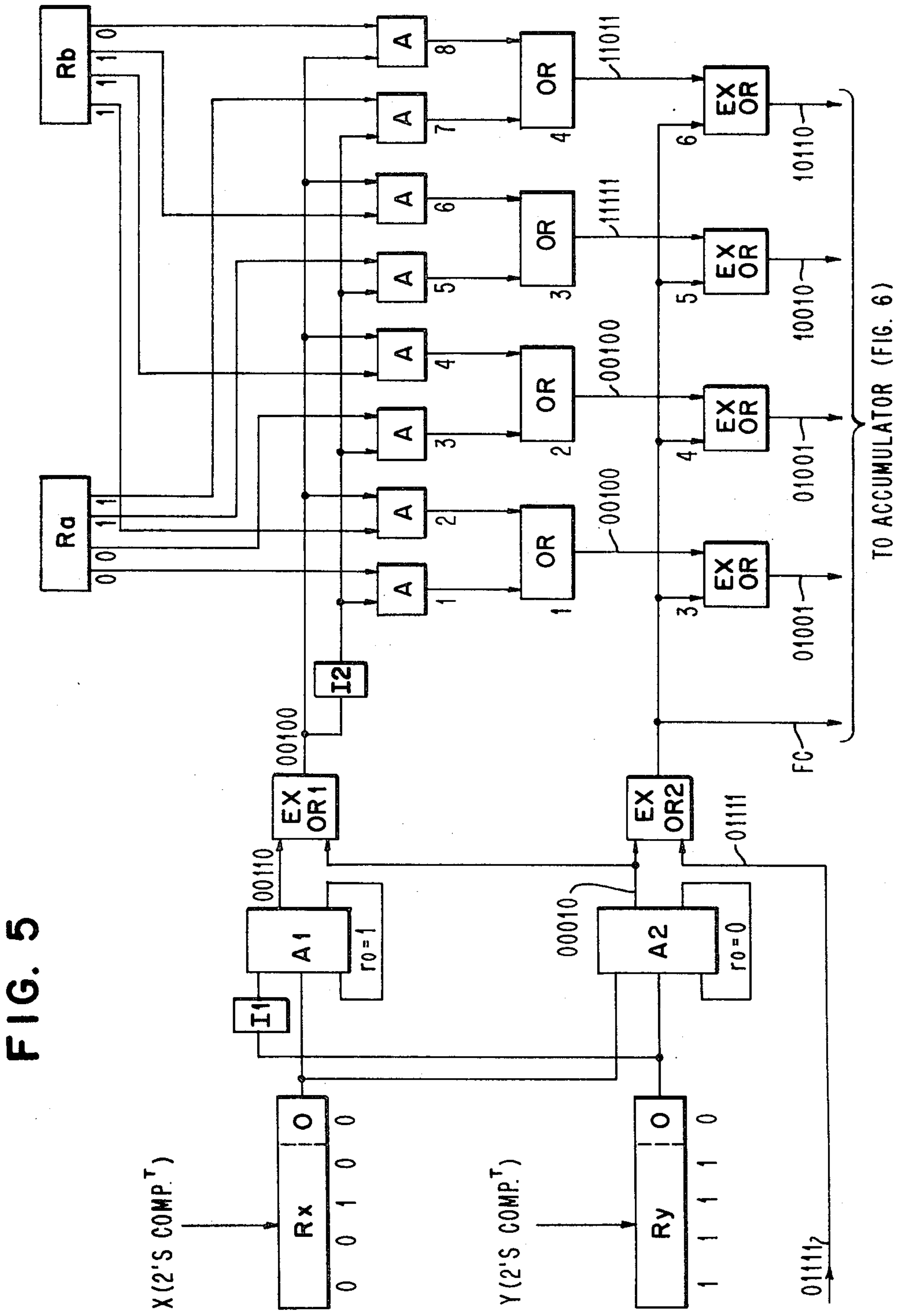
FIG. 5 illustrates another embodiment of the multiplication and summing device shown in FIG. 4.

The principles of the invention can also be applied to a system for carrying out the sum of several multiplications. FIGS. 4 and 5 show two embodiments of a system for carrying out sum $S = AX + BY$ where $A$, $B$, $X$ and $Y$ are algebraic numbers in the binary form. The disclosed system is based also upon the principle of the series-parallel multiplication. It will be supposed that multiplicands A and B are available in the form of two's complement coded binary words in registers $R_a$ and $R_b$. Likewise, factors X and Y are available in the CIM code in registers $R_x$ and $R_y$.

With multipliers X and Y in the CIM code, a bit 0 is representative of −1 whereas a bit 1 is representative of +1. Then, the necessary partial products will be A+B (a combination of bits of same ranks of X and Y: 11) A−B (combination 10) A+B (combination 01), −A−B (combination 00), −A+B (combination 01).

Therefore, a first embodiment consists in forming, from multiplicands A and B, the four partial products ± (A±B). FIG. 4 shows the corresponding embodiment. From numbers A and B contained in registers $R_a$ and $R_b$, numbers A+B and A−B are constructed in registers $R_{a+b}$ and $R_{a-b}$ by means of logic L. Said logic is well known in the art and, therefore, will not be detailed hereinafter. It should be remarked that only partial products +(A±B) have been generated. As a matter of fact, it is not necessary to generate partial products −(A±B), as shown hereinafter with reference to table I. This table shows the different combinations of the bits of same ranks of X and Y in a first column and the corresponding partial products, in a second column,

TABLE I

| bit of X ($x_i$) | bit of Y ($y_i$) | Partial Products |
|---|---|---|
| 0 | 0 | −(A + B) |
| 0 | 1 | −(A − B) |
| 1 | 0 | +(A − B) |
| 1 | 1 | +(A + B) |

The symmetry observed in the table shows that it suffices to have only two partial products and to index the selection of the correct partial product by either of bits $x_i$ or $y_i$. The indexing operation can be carried out in different ways; for instance, there will be considered the indexing operation upon bit X. Then, only the lower part of table I is concerned and the value of $y_i$ will determine the partial product to be chosen. Such an operation is as follows: should value of bit $x_i$ be 1, nothing is modified and the partial product is required which is indicated by the value of $y_i$ in the lower part of table I. Should the value of bit $x_i$ be 0, the complement $\overline{y_i}$ of bit $y_i$ of Y is considered, the partial product is required which is indicated by value $\overline{y_i}$ and the sign is inverted. Then, it can be verified that only two partial products are required: for instance, A+B and A−B. −(A+B) and −(A−B) might have been considered, modifying nothing for $x_i$=0 and proceeding to the above modifications for $x_i$=1. $y_i$ might also be indexed, a case wherein the two necessary partial products would B+A and B−A or −(B+A) and −(B−A). All these solutions are equivalent but, in FIG. 4, the solution which makes use of the partial products A+B and A−B has been represented.

An embodiment for indexing and extracting partial products will now be set forth with reference to FIG. 4. Bits $x_i$ of X and $y_i$ of Y are series-extracted from registers $R_x$ and $R_y$, respectively. Bit $x_i$ goes through inverter $I_1$ and is applied to the other input of circuit XOR1. Therefore, $y_i$ is obtained at the output of circuit XOR1 if $x_i$=1 and $y_i$ is, if $x_i$=0, which completes the first portion of the indexing operation.

The partial products are extracted by means of AND circuits 1 through 8 and OR circuits 1 through 4, AND circuits 2, 4, 6 and 8 receive the output of circuit XOR1 on one of their inputs whereas AND circuits 1, 3, 5 and 7 receive the same output of circuit XOR1 on one of their inputs, but inverted in inverter $I_2$. On the other hand, AND circuits 1, 3, 5 and 7 receive one bit of register $R_{a-b}$ on their other inputs whereas AND circuits 2, 4, 6 and 8 receive each, a bit of register $R_{a+b}$. Thus, should the value of the output of circuit XOR1 be 1, AND circuits 1, 3, 5 and 7 are blocked (non-conducting condition) and circuits 2, 4, 6 and 8 are open (conducting condition): the contents of register $R_{a+b}$ (i.e., number A+B) is recovered in parallel on the outputs of OR circuits 1, 2, 3 and 4. On the contrary, should the value of the output of circuit XOR1 be 0, AND circuits 1, 3, 5 and 7 are open and AND circuits 2, 4, 6 and 8 are blocked. The contents of register $R_{a-b}$ (i.e., number A−B) is recovered in parallel at the outputs of OR circuits 1, 2, 3 and 4.

The second portion of the indexing operation remains to be carried out, which consists as seen above, in inverting the partial products when the value of bit $x_i$ is 0. To this end, the output $\overline{x_i}$ of inverter $I_1$ is applied in parallel to one of the inputs of each of the four Exclusive OR circuits XOR 3, 4, 5 and 6. Circuit XOR3 receives the output of OR circuit 1 at its other input and, likewise, circuits XOR4, 5 and 6 receive respectively the outputs of OR circuits 2, 3 and 4. Thus, if $\overline{x_i}$=1, circuits XOR3, 4, 5 and 6 will inverse, bit after bit, the inputs received from OR circuits 1, 2, 3 and 4 and will supply, at their respective outputs, number $\overline{A+B}$ or $\overline{A-B}$ in parallel. It should be recalled here, that in fact, −(A+B) and −(A−B), are required. To this end, a "1" must be added to binary numbers $\overline{A+B}$ and $\overline{A-B}$, respectively, since it is known that:

The binary expression of −(A+B) is = $\overline{A+B}$+1 and the binary expression of −(A−B) is: $\overline{A-B}$ + 1

Instead of directly carrying out said addition upon each binary term $\overline{A+B}$ and $\overline{A-B}$, the addition of partial products can be carried out in the accumulator. In practice, it has been chosen to send the products successively present on the outputs of circuits XOR3 through 6 into the accumulator and, in parallel through line FC, a succession of corrective bits equal to 0 should the corresponding product be A+B or A−B, and equal to 1, should the corresponding product be $\overline{A+B}$ or $\overline{A-B}$. It can be observed that the succession of the corresponding bits represent, in fact, $\overline{X}$. Since this number $\overline{X}$ is available at the output of inverter $I_1$, line FC carrying the succession of the corrective bits is, therefore, directly connected to the output of inverter $I_1$. The accumulation of the partial products and the addition of the corrective bits will be disclosed at the same time, with reference to a particular embodiment of the accumulator shown in FIG. 6.

But, beforehand, there will be disclosed a second embodiment of this part for generating the partial products into a two-multiplication summing device. This second embodiment, shown in FIG. 4, is deduced from the previous one due to the following remarks. In the first above-mentioned embodiment, the partial products were obtained upon combination of sums and differences of multiplicands A and B. It is possible to obtain the same result by proceeding to combinations of sums and differences of multipliers X and Y, as shown in table II given hereinafter. The first column is indicative of the bit of rank *i* in the binary number representative of X+Y (in CIM code), the second column is, of the bit of same rank *i* in the number representative of X−Y (in CIM code) and the third column is, of the partial products corresponding to the different possible combinations.

TABLE II

| Y+X (bit of rank i) | X−Y (bit of rank i) | Partial Products |
|---|---|---|
| 0 | 0 | −A |
| 0 | 1 | −B |
| 1 | 0 | +B |
| 1 | 1 | +A |

This result can be easily shown when writing:

$AX + BY = [(A+B) + (A-B)/2]\ X + [(A+B) - (A-B)/2]\ Y$

When grouping differently, there is obtained:

$AX + BY = (A+B/2)\ (X+Y) + (A-B/2)\ (X-Y)$

Therefore, it can easily be observed that if the bit of rank $i$ of $(X+Y)$ is 0 (which is indicative of value −1 in the CIM code), and if the bit of rank $i$ of $(X-Y)$ is also 0 (value −1 in the CIM code), the corresponding partial product will be:

$$(-1 \times (A+B/2)) + (-1 \times (A-B/2)) = -A$$

Likewise, for combination 01:

$$(-1 \times A+B/2) + (+1 \times A-B/2) = -B$$

for combination 10:

$$(+1 \times A+B/2) + (-1 \times A-B/2) = +A$$

and for combination 11:

$$(+1 \times A+B/2) + (+1 \times A-B/2) = +B$$

which justifies table II.

Table II shows off a symmetry quite similar to that verified in the foregoing with reference to table I: the same indexing facilities, therefore, are available. It has been chosen, with reference to FIG. 5, to index upon X+Y and, therefore, to make use of partial products +A and +B, only.

In conformity with the principles of the invention, the multiplying factors X+Y and X−Y are presented in the CIM coded series form. FIG. 5 shows how X+Y and X−Y can be obtained in the CIM code. Indeed, the CIM code lends itself uneasily to the addition operations and it is preferable to carry out sums X+Y and X−Y upon factors X and Y in a conventional code. It has been supposed that factors X and Y were available in the two's complement code and the first transcoding portion is carried out in registers $R_x$ and $R_y$ by adding a bit position containing a 0 to the two factors X and Y. Then, the contents of $R_x$ and $R_y$ are sent, bit after bit, to the two inputs of adder $A_2$ which series-supplies sum X+Y. The contents of $R_x$ is also sent bit after bit to adder $A_1$ at the same time as the contents of $R_y$ inversed in inverter $I_1$. Adder $A_1$ has its carry input forced to "1" at the beginning, which has been shown by $r_o$=1 so that it may supply at its output, sum $X+\bar{Y}+l$, i.e., X−Y. But it should be noted that X+Y and X−Y are not CIM coded; to bring them into this code, their bits of highest ranks have to be inverted. However, it can be observed that, for the operation of circuit XOR1, such an inversion is not necessary since the output of said circuit is not responsive to the simultaneous inversion of each of the binary signals at its two inputs. On the other hand, the indexing by the value of X+Y must allow for the inversion of the bit of the highest order. The inversion is carried out at this level by Exclusive OR ciruit XOR2 which receives the series-number X+Y on one of its inputs, and, a succession of bits on the other one, which is in a number equal to the number of bits of X+Y and each of them being of value 1 with the exception of the highest order bit the value of which is 0. This circuit XOR2 inverts all the bits of X+Y received on one of its inputs with the exception of the last bit.

As to multiplicands A and B, they are contained in registers $R_a$ and $R_b$ the bit outputs of which are directly sent to AND circuits 1 through 8. The description and the operation of the rest of the device are quite similar to those set forth with respect to FIG. 4. Therefore, they will not be further described. It will simply be mentioned that, at the output of the group of OR circuits 1 through 4, there is obtained either A or B with respect to the value of the output of circuit XOR1. And circuits XOR 3 through 6 invert, bit after bit, the outputs of OR circuits 1 through 4 or, on the contrary, let them pass with no modifications according to the value of the output of circuit XOR2. Here too, circuits XOR3 through 6, therefore, supply either +A or +B, either $\bar{A}$ or $\bar{B}$. In the last two cases, "1" will have to be added to obtain the binary values of −A and −B, which will be carried out in the accumulator.

Up to now, and with reference to FIGS. 3, 4 and 5, different implementations have been disclosed in order to obtain the partial products necessary for the multiplication. It remains to terminate the multiplication by adding the partial products and giving each its own rank. To this end, any shift accumulator of a well-known type can be utilized. This accumulator receives the successive partial products and adds them after appropriate shifts in order to allow for the rank of each partial product. In addition, it receives the corrective bits coming from line FC (FIGS. 3, 4 and 5) and introduces them into the addition. At the output of the accumulator, the result of the multiplication (FIG. 3) or of the sum of the multiplications $S=AX+BY$ (FIGS. 4 and 5) is available in the two's complement code since factors in the two's complement code have been accumulated, either in series or in parallel, according to the chosen type of the accumulator.

However, a number of remarks should be made about the operation of the accumulator, whatever be its type, in order to take the particularities of the CIM code into account.

First, it has been said that, in that code, the two bits of the lowest order would correspond, in fact, to the same binary weight. The accumulation of the corresponding partial products will therefore, be made with no shift with respect to one another. Of course, the same holds true for the first two bits of the corrective factor sent through line FC.

The second remark is to specify that, because of the additional bit existing in the CIM code, the number obtained at the output of the accumulator will contain a non-significant bit, namely, the bit of the lowest order. In order to obtain the correct result at the output, the lowest rank bit will, therefore, have to be neglected.

Figure 6:
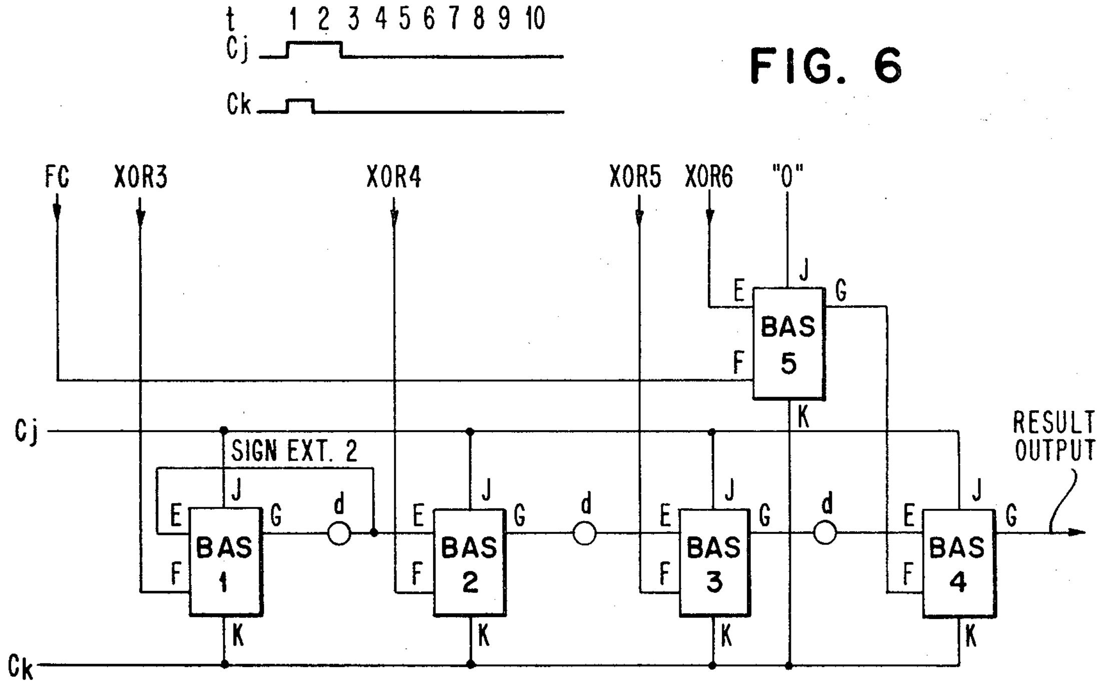
FIG. 6 sets forth a particular shift accumulator necessary for the completion of the devices shown in FIGS. 3, 4 and 5.

A particular embodiment capable of fulfilling the above-disclosed functions will now be disclosed with reference to FIG. 6. But it is understood that such an accumulator is given by way of an example only; the man skilled in the art will be able to adapt easily the principles which will be indicated for the other types of accumulators. The accumulator disclosed here, is of the type disclosed in the above-mentioned handbook by R. K. Richards, on pages 155 and 156 (FIGS. 5 and 10).

Figure 7:
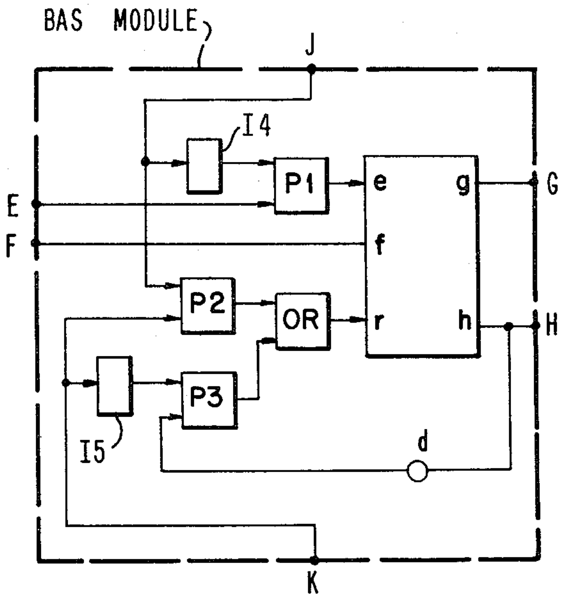
FIG. 7 shows an adder module utilized in FIG. 6.

The basic element of such an accumulator is module BAS (Basic Adder Stage) shown in FIG. 7. It includes a complete adder with two data inputs $c$ and $f$, one carry input $r$ and two outputs $q$ and $h$, supplying the sum module two and the carry, respectively. Module BAS includes, itself, two data inputs E and F, two control inputs J and K and two outputs G and H. Outputs G and H are connected to outputs $g$ and $h$ of the adder, respectively, whereas input F is connected to input $f$ of the adder. Input E is connected to $e$ through intermediary of AND gate $P_1$ which is controlled by the signal applied to J after inversion by inverter $I_4$. The signals applied to inputs J and K go through AND circuits $P_2$ the output of which is connected to one input of OR circuit $Q_1$. The output of $Q_1$ receives the output of AND circuit $P_3$ the inputs of which are the output signal $h$ of the adder, delayed over a bit time by a delay element $d$, on the one hand, and the signal applied to K inverted by inverter $I_5$, on the other hand.

The accumulator is formed of a plurality of modules BAS 1 through 4 which are cascade-mounted, i.e., input E of one module is connected to output G of the preceding module through a bit time-delay element $d$. Input F of each module receives a bit of the partial product to be accumulated from the corresponding circuits XOR3 through 6. More specifically, the output of circuit XOR4 is applied to that of module BAS 2, the output of XOR5 is, to that of module BAS 3. The output of XOR6 which corresponds to the bit of the lowest rank is, however, connected to input E of an additional module BAS 5 which, on the other hand, receives on its input F, the corrective factor present on line FC which has been mentioned above. Output G of module BAS 5 drives directly input F of module BAS 4. Finally, it should be noted that output G of module BAS 1 is looped on input E of this very module after its being delayed over one bit time: such an operation comes to repeat the highest rank bit in a position of bit of a rank immediately higher, which is necessary to obtain an accurate result when accumulating two's complement numbers. On the other hand, inputs J of modules BAS 1 through 4 are connected to line C which carries clock signals represented under FIG. 6. Likewise, inputs K of these very modules are connected to line $C_k$ which carries also clock signals.

The operation of such an accumulator will now be set forth with respect to FIG. 6 and table III which is an (figured) example for such an operation. The assembly of the accumulator operates under the control of a clock (not shown) which transmits time signals. Each signal lasts a given elementary time instant which will be chosen in terms of the characteristics of the system. Thus, the operation of the accumulator can be divided, in order to make the understanding clearer, into a given number of successive states corresponding to the succession of the elementary times $t_1$ through $t_{10}$. This is shown in table III which corresponds to a particular example the values of which have been indicated in FIG. 5.

TABLE III

| | BAS 1 | BAS 2 | BAS 3 | BAS 4 | BAS 5 |
|---|---|---|---|---|---|
| | EF GH | EF GH | EF GH | EF GH | EF GH |
| Time: | | | | | |
| 1 | 1 0 1 | 1 0 1 | 0 1 0 | 1 0 1 | 0 1 1 0 |
| 2 | 0 1 0 | 0 1 0 | 1 1 0 | 1 0 1 | 1 0 1 0 |
| 3 | 1 0 1 0 | 1 0 1 0 | 1 0 1 0 | 1 0 0 1 | 1 1 0 1 |
| 4 | 1 1 0 1 | 1 1 0 1 | 1 0 1 0 | 1 0 0 1 | 0 1 0 1 |
| 5 | 0 0 1 0 | 0 0 1 0 | 0 1 1 0 | 1 0 0 1 | 1 0 0 1 |
| 6 | 1 . 1 0 | 1 . 1 0 | 1 . 1 0 | 1 1 1 1 | . . 1 0 |
| 7 | 1 . 1.0 | 1 . 1 0 | 1 . 1 0 | 1 0 0 1 | . . 0 0 |
| 8 | 1 . 1 0 | 1 . 1 0 | 1 . 1 0 | 1 0 0 1 | . . 0 0 |
| 9 | 1 . 1.0 | 1 . 1 0 | 1 . 1 0 | 1 0 0 1 | . . 0 0 |
| 10 | 1 . 1 0 | 1 . 1 0 | 1 . 1 0 | 1 0 0 1 | . . 0 0 |

It is recalled here that, because of the structure of the CIM code, the first two partial products must be accumulated without any shift. It is supposed that a general resetting of the accumulator has been carried out previously (the resetting circuits have not been shown in the Figure in order to make the latter clearer, but is is obvious that such circuits are necessary). At time $t_1$, control inputs J and K of modules BAS 1 through 4 are high (binary value "1"). The fact that input J, blocks AND gates $P_1$ of modules EAS 1 through 4, respectively and prevents input E from being applied to the corresponding adder. On the other hand, since J and K are high, a "1" is applied to input $r$ of each adder at the same time as the bit of the first number to be accumulated at input $f$. Finally, the looping of carry H is avoided through AND gate $P_3$. Still at time $t_1$, module BAS 5, the control input J of which is continuously down, as shown in the figure, receives the bit of the first number to be accumulated at its input E and the first bit of the corrective factor at its input F. Module BAS 5 presents the sum modulo 2 at its output G which is directly applied to input F of modulo BAS 4.

At time $t_2$, input J of each module BAS 1 through 4 remains high, but input K becomes down, which blocks gate $P_2$ but opens gate $P_3$. The adder of each module BAS 1 through 4, then receives an input F and the carry H of the operations corresponding to the preceding time. At the same time $t_2$, module BAS 5 receives the bit of the second partial product to be accumulated and the second bit of the corrective factor. Its output G presents the sum (still modulo 2) to input $f$ of module BAS 4. Thus, the addition of the first two partial products without relative shift, has been made.

At time $t_3$, inputs J and K of modules 1 through 4 are down, which causes gates $P_1$ and $P_3$ to pass input E and the carry of the operation corresponding to the preceding time, gate $P_2$ remaining closed. Then, the feeding of output G back to input E of BAS 1 is allowed (extension of the sign bit on the left); likewise, output G of each module is transmitted to input E of the next following module with a delay corresponding to one elementary time and the carry of the preceding operation is fed back to input $r$ of each adder during the following time. The accumulation, then is carried out with a shift.

The operations performed during the following time instants are similar to that which has just been set forth for time $t_3$. Therefore, they will not be described further on.

Table III, interpreted as disclosed above, makes it possible to follow the different operating steps of the accumulation.

It should be remarked that from time $t_6$, inputs F of modules BAS 1 through 4 and inputs E and F of module BAS 5 do not receive any longer information since there is no more partial product to be accumulated. But however, the operation is not over since it remains sums and carries to be sent, in the succession of modules BAS 1 through 4. The operation will be over only when the required number of significant bits of the result is obtained. As a matter of fact, it is known that the multiplication of a word of $m$ bits (sign bit included) by a word of $n$ bits (sign bit included) supplies a word of $m+n-1$ significant bits at most. Since, here, the sum of two multiplications is performed, which has for a risk to require an additional bit position, the total number of significant bits would be $m+n$.

The output of the accumulator is obtained, bit after bit, at output G of module BAS 4. In the chosen example, there are eight significant bits since factors A, B, X and Y have been chosen as being four-bit long, and since $A=+3$, $b=-2$, $X=+2$, $Y=-1$, it is verified that output G of BAS 4 supplies result $+8= 3 \times 2 + (-2) \times (-1)$.

In fact, the disclosed accumulator has, as an output, two on significant bits before the eight significant bits. The first bit that is extracted from accumulator at time $t_1$ is nothing for the final result, since the first addition of partial products is performed at time $t_2$. It must, therefore, be discarded. As to the second bit extracted from the accumulator at time $t_2$, it is representative of the additional bit resulting from the transcoding operation of the multiplicands into the CIM code. For a correct result in the two's complement code, said bit must also be discarded.

The last significant bit will, therefore, be extracted at time $t_{10}$ and the reading of the correct result will be carried out from time $t_3$ up to time $t_{10}$. A time $t_{11}$ will possibly be utilized for a general resetting of the accumulator.

It can be observed that the disclosed accumulator supplies the result of a multiplication of one (or two) $m$-bit multipliers by one (or two) $n$-bit multiplicand within $m+n$ elementary times. But it should be noted that, from time $m+2$, the accumulator receives no more partial products to be accumulated (inputs F of the modules receive nothing more). The $n-1$ next following elementary times are utilized for the propagation and the addition of sums and carries already present in the accumulator. To this end, it is not necessary to make use of complete adders: upon each elementary time, as a matter of fact, there is only one addition and one series of shifts to be performed. Therefore, it is possible to clear the modules in the accumulator after $m+1$ elementary times by "emptying" outputs G and H (sum and carry) of each module into two shift registers with a complete adder receiving upon each elementary time, the lowest rank bit in each register. With such an arrangement, the first $m+1$ bits of the result are available at the output of module BAS 4 disclosed with respect to FIG. 6, then from time $m+2$, the following $n-1$ bits of the result are obtained at the output of the complete adder which adds the lowest rank bits in the two shift registers. Such an arrangement will not be further disclosed for the man skilled in the art will be able to implement it in an easy manner. It makes possible to release the modules of the accumulator after $m+1$ elementary times, and therefore, to start with another multiplication before waiting for the end of the preceding operation. Of course, a simple logic will be necessary to group the bits belonging to a same result which, in turn, are extracted by series of $m+1$ or $n-1$ series, respectively, from the last module of the accumulator and from the complete adder coming after the two shift registers.

The foregoing discloses two embodiments of a device used to perform sum $S=AX+BY$ where $A$, $B$, $X$ and $Y$ are algebraic numbers expressed in the binary form. In practice, it is often necessary to obtain, in a more general form, a sum of the type:

$$S= \sum_{i=1}^{n} A_i X_i$$

The generalization of the above-described system can be performed in many ways, according to the considered embodiment.

The first embodiment disclosed with reference to FIG. 4, can be generalized in a very simple manner. From factors A and B, half of the necessary partial products are generated, namely, factors $A_1 + A_2 \pm A_3 \ldots \pm A_n$ i.e., $2^{n-1}$ partial products corresponding to $-(A_1 \pm A_2 \pm A_3 \pm \ldots \pm A_n)$ are not required as seen above. An assembly of AND circuits will make it possible, with respect to the particular combination of the corresponding bits of factors $X_i$, to select the required partial product, in a way similar to that for the case of the two factors represented in FIG. 4. A single shift accumulator will be necessary to accumulate the partial products. This solution, therefore, is remarkably simple as to the accumulation of the partial products but it is relatively cumbersome as to the generation of these very partial products.

Another solution would consist in processing in parallel the sums for the multiplications of two factors by two factors according to the diagram shown in FIG. 4, and in summing the results for obtaining the final sum. In that case, $n$ partial products only will have to be generated, but $n/2$ (or $n+1/2$ should $n$ be an odd number) shift accumulators will also be required. In addition, a number of additional complete adders will be necessary to sum the results supplied by the accumulators in order to obtain the final sum.

The second embodiment (FIG. 5) can also be generalized by the above second method, i.e., the setting in parallel of several devices according to FIG. 4 and the summation of the results supplied by the different shift accumulators.

It is clear that the preceding description has only been given as an unrestrictive example and that numerous alternatives may be considered without departing from the spirit and scope of the invention.

The invention is not limited as to its applications. From among those applications, there can be mentioned the digital filtering, the signal correlation and convolution, and the automatic transmission equalizers, to which this invention seems to be particularly well-adapted.

What is claimed is:

1. In a serial-parallel multiplication device in which each digit of a multiplicand A (FIG. 3-RA) in two's complement form is logically combined with a digit of a multiplier X (FIG. 3-RX) also in two's complement form to yield a partial product; the combination comprising:

means (FIGS. 1 or 2) for modifying the multiplier by inverting the highest ranking digit and appending another digit of predetermined value as the last digit, the appended digit having the same rank as the lowest ranking digit;

logic means (FIG. 3-I, XOR3 to 6) for inverting each modified multiplier digit and for combinaing the $i^{th}$ modified multiplier digit with each multiplicand digit, each combined digit assuming one binary value if the corresponding ranked multiplicand and $i^{th}$ multiplier digits match and another binary value if they mismatch; and means (FC, FIG. 6) for summing the combined digits and the $i^{th}$ modified multiplier digit to form the partial product.

2. In a serial-parallel multiplication device according to claim 1, said device further includes:

accumulator means (FIG. 6) for successively shifting and summing partial products.

* * * * *